(12) United States Patent
Makhe et al.

(10) Patent No.: US 12,220,965 B2
(45) Date of Patent: Feb. 11, 2025

(54) THERMAL MANAGEMENT SYSTEM WITH DUAL CONDENSERS

(71) Applicant: EATON INTELLIGENT POWER LIMITED, Dublin (IE)

(72) Inventors: Sunil Madhukar Makhe, Maharashtra (IN); Parag Ashok Gumaste, Pune (IN); Parimal Maity, Pune (IN); Manoj Prakash Gokhale, Pune (IN); Rishabh Kumar Jain, Maharashtra (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 242 days.

(21) Appl. No.: 17/944,438

(22) Filed: Sep. 14, 2022

(65) Prior Publication Data
US 2023/0079696 A1    Mar. 16, 2023

(30) Foreign Application Priority Data
Sep. 14, 2021   (IN) .............................. 202111041292

(51) Int. Cl.
*B60H 1/00* (2006.01)
*B64D 27/24* (2024.01)
(Continued)

(52) U.S. Cl.
CPC ..... *B60H 1/00278* (2013.01); *B60H 1/00899* (2013.01); *B64D 27/24* (2013.01);
(Continued)

(58) Field of Classification Search
CPC ............ B60H 1/00278; B60H 1/00899; B60H 2001/00307; B64D 27/24; B64D 33/10; B64D 33/08; H01M 10/625; H01M 2220/20; H01M 10/613; H01M 10/635; H01M 10/6568; F25B 41/20
See application file for complete search history.

(56) References Cited

U.S. PATENT DOCUMENTS 8,448,460 B2    5/2013  Dogariu et al.
9,669,936 B1 *  6/2017  Fiterman ................ B64D 13/06
(Continued)

FOREIGN PATENT DOCUMENTS

CN    111591108 A    8/2020
CN    112888584 A    6/2021
(Continued)

OTHER PUBLICATIONS

Extended European Search Report for Application No. 22195471.2 mailed Feb. 7, 2023.

*Primary Examiner* — Ljiljana V. Ciric
(74) *Attorney, Agent, or Firm* — Merchant & Gould P.C.

(57) ABSTRACT

A thermal management system includes a refrigeration circuit that cools at least a first coolant that circulates around a battery cooling loop. Refrigerant of the refrigeration circuit is cooled at a liquid-cooled condenser and at an air-cooled condenser. In certain examples, the liquid-cooled condenser is cooled by coolant circulating along a propeller arrangement cooling loop. In certain examples, the coolant from the propeller arrangement cooling loop may be combined with coolant from the battery cooling loop.

12 Claims, 11 Drawing Sheets

(51) Int. Cl.
*F25B 41/20* (2021.01)
*H01M 10/625* (2014.01)

(52) U.S. Cl.
CPC .......... *F25B 41/20* (2021.01); *H01M 10/625* (2015.04); *B60H 2001/00307* (2013.01); *H01M 2220/20* (2013.01)

(56) References Cited

U.S. PATENT DOCUMENTS

| | | | |
|---|---|---|---|
| 9,780,422 B2 | 10/2017 | Dunn et al. | |
| 10,076,944 B2 | 9/2018 | Jalilevand et al. | |
| 10,513,982 B2 | 12/2019 | Dailey et al. | |
| 10,644,367 B2 | 5/2020 | Jalilevand et al. | |
| 10,710,433 B2 * | 7/2020 | Graaf | B60H 1/00278 |
| 10,794,617 B2 * | 10/2020 | Moxon | B64D 27/24 |
| 10,960,785 B2 | 3/2021 | Villanueva et al. | |
| 11,827,370 B1 * | 11/2023 | Freer | B64D 33/08 |
| 2012/0085512 A1 * | 4/2012 | Graaf | H01M 10/663 165/51 |
| 2018/0170569 A1 | 6/2018 | Brodeur | |
| 2019/0100319 A1 | 4/2019 | Mackin | |
| 2019/0128570 A1 * | 5/2019 | Moxon | H02K 11/0094 |
| 2019/0356030 A1 | 11/2019 | Venkatasubramanian et al. | |
| 2020/0047908 A1 | 2/2020 | Filipenko et al. | |
| 2020/0298663 A1 * | 9/2020 | Allgaeuer | B60H 1/00885 |
| 2020/0339010 A1 | 10/2020 | Villanueva et al. | |
| 2020/0343601 A1 | 10/2020 | Carlson | |
| 2020/0355119 A1 | 11/2020 | Ribarov | |
| 2020/0361304 A1 | 11/2020 | Takamatsu | |
| 2020/0391876 A1 | 12/2020 | Morrison | |
| 2021/0053689 A1 | 2/2021 | Lynn et al. | |
| 2021/0061477 A1 | 3/2021 | Heironimus | |
| 2021/0156296 A1 | 5/2021 | Xi et al. | |
| 2022/0271363 A1 | 8/2022 | Burkell | |
| 2022/0306305 A1 * | 9/2022 | Cottrell | B64D 33/08 |
| 2023/0067744 A1 | 3/2023 | Cantrell et al. | |
| 2023/0070111 A1 * | 3/2023 | Jain | H01M 10/613 |
| 2023/0079696 A1 * | 3/2023 | Makhe | B60H 1/00278 165/42 |
| 2023/0202256 A1 * | 6/2023 | Lonberger | B60H 1/00271 165/42 |
| 2023/0406519 A1 * | 12/2023 | Freer | B64D 33/08 |

FOREIGN PATENT DOCUMENTS

| | | | |
|---|---|---|---|
| CN | 213383775 U | 6/2021 | |
| DE | 10 2008 062 176 A1 | 6/2010 | |
| DE | 10 2018 113 687 A | 12/2019 | |
| EP | 3480114 A1 * | 5/2019 | ............ B64D 13/06 |
| KR | 10-2016-0046262 A | 4/2016 | |
| KR | 10-2019-0048379 A | 5/2019 | |
| WO | 2018/154782 A1 | 8/2018 | |
| WO | 2021/095395 A1 | 5/2021 | |
| WO | 2022/184325 A1 | 8/2022 | |

\* cited by examiner

THERMAL MANAGEMENT SYSTEM WITH DUAL CONDENSERS

CROSS-REFERENCE TO RELATED APPLICATION

This application claims the benefit of Indian Provisional Patent Application No. 202111041292, filed on Sep. 14, 2021, the disclosure of which is incorporated herein by reference in its entirety.

BACKGROUND

Various components within an aircraft require thermal management to operate. For example, a propeller motor and a battery powering the propeller motor both generate heat during operation and can overheat (surpass an upper temperature limit) if left uncooled. Certain components, such as the battery, also may have a lower temperature limit to operate properly. Accordingly, the aircraft is equipped with a thermal management system including cooling circuits for these components.

The thermal cycling of these components does not remain constant during a flight. Rather, each component may have a normal operating temperature based on normal power consumption during the flight and peak operating temperatures resulting from specific events occurring during the flight. For example, the heat of a motor and/or inverter of a propeller arrangement of the aircraft may increase during take-off, landing, hovering, or turning of the aircraft compared to the temperature during cruising. The heat of the battery also may cycle based on how much power is drawn by the propeller arrangements or other components during the flight. Accordingly, the thermal management system is typically configured to provide sufficient cooling for the expected elevated temperatures.

SUMMARY

Aspects of the disclosure are directed to a thermal management system for an aircraft and methods of use thereof.

In accordance with some aspects of the disclosure, the thermal management system includes a refrigeration loop, a battery cooling loop, and a propeller arrangement cooling loop. First coolant circulating through the battery cooling loop is cooled by refrigerant circulating through the refrigeration loop. The refrigerant is cooled by an air-cooled condenser exposed to ambient air outside the aircraft and by a liquid-cooled condenser. Second coolant circulating through the propeller arrangement cooling loop is cooled by a radiator exposed to ambient air outside the aircraft.

In certain implementations, the liquid-cooled condenser is cooled by the second coolant circulating through the propeller arrangement cooling loop.

In certain implementations, an electronic controller and a valve arrangement determines how much of the second coolant is directed to the liquid-cooled condenser. In certain examples, the amount and/or flowrate of second coolant directed to the liquid-cooled condenser is increased when the ambient temperature exceeds a predetermined threshold (e.g., above 30 degrees Celsius) and/or when a cooling load of the battery exceeds another predetermined threshold (e.g., based on a upper temperature limit for which the battery is rated). In certain examples, the amount and/or flowrate of second coolant directed to the liquid-cooled condenser is decreased when the ambient temperature drop below a predetermined threshold (e.g., below 0 degrees Celsius) and/or when a cooling load of the battery drops below another predetermined threshold (e.g., based on a lower temperature limit for which the battery is rated).

In certain implementations, the second coolant circulating through the propeller arrangement cooling loop can be directed to the chiller to be further cooled by the refrigeration loop. In some examples, the second coolant is kept separate from the first coolant when routed through the chiller. In other examples, the second coolant is combined with the first coolant when routed through the chiller.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Figure 1:
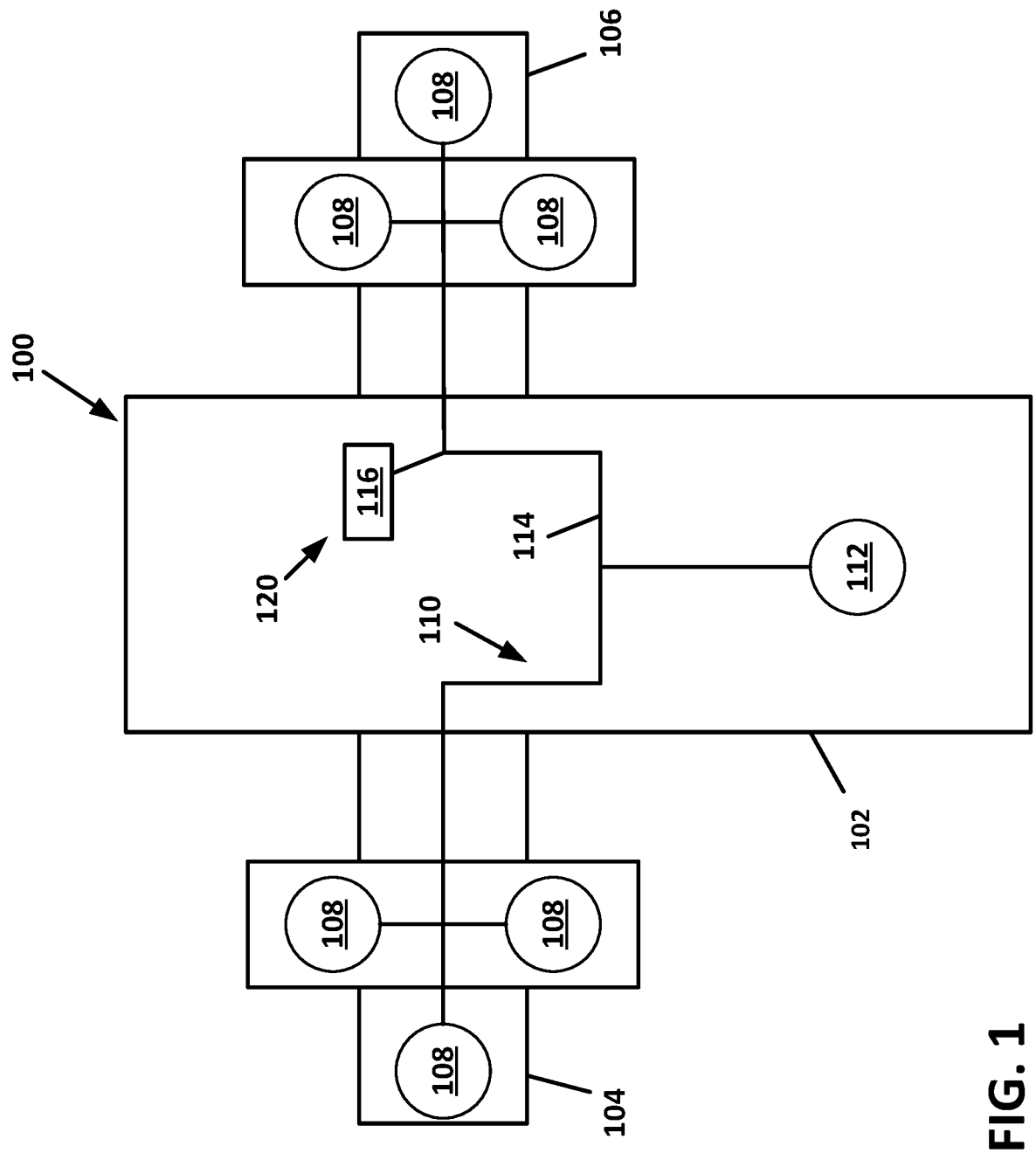
FIG. 1 is a schematic diagram of an example aircraft power system.

Reference will now be made in detail to exemplary aspects of the present disclosure that are illustrated in the accompanying drawings. Wherever possible, the same reference numbers will be used throughout the drawings to refer to the same or like parts.

An aircraft 100 includes a fuselage 102 defining a cabin sized to carry a pilot and one or more passengers. The aircraft 100 also includes a first wing 104 and a second wing 106 that each carry one or more propeller arrangements 108 or other propulsion components. In the example shown, three propeller arrangements 108 are disposed at each wing 104, 106. In other examples, however, each wing 104, 106 may carry any desired number or propulsion components. In certain examples, each propeller arrangement 108 includes a propeller, a motor, and an inverter to operate the propeller arrangement 108. Other configurations are possible.

The aircraft 100 includes a power system 110 including at least one battery 112 that powers the propeller arrangements 108 via a power bus 114. In the example shown, the propeller arrangements 108 are powered by a main battery 112 carried by the fuselage 102. In other examples, the propeller arrangements 108 may be powered by one or more batteries 112 carried by the wings 104, 106. In certain implementations, the power system 110 also provides electric power to other components of the aircraft such as the flight management system, the control display unit, and/or lighting. In certain implementations, the power system 110 also provides electric power to one or more components 116 (e.g., a compressor, a pump, etc.) of a thermal management system 120 used to cool the battery 112 and/or other components such as the propeller arrangement 108.

Figure 2:
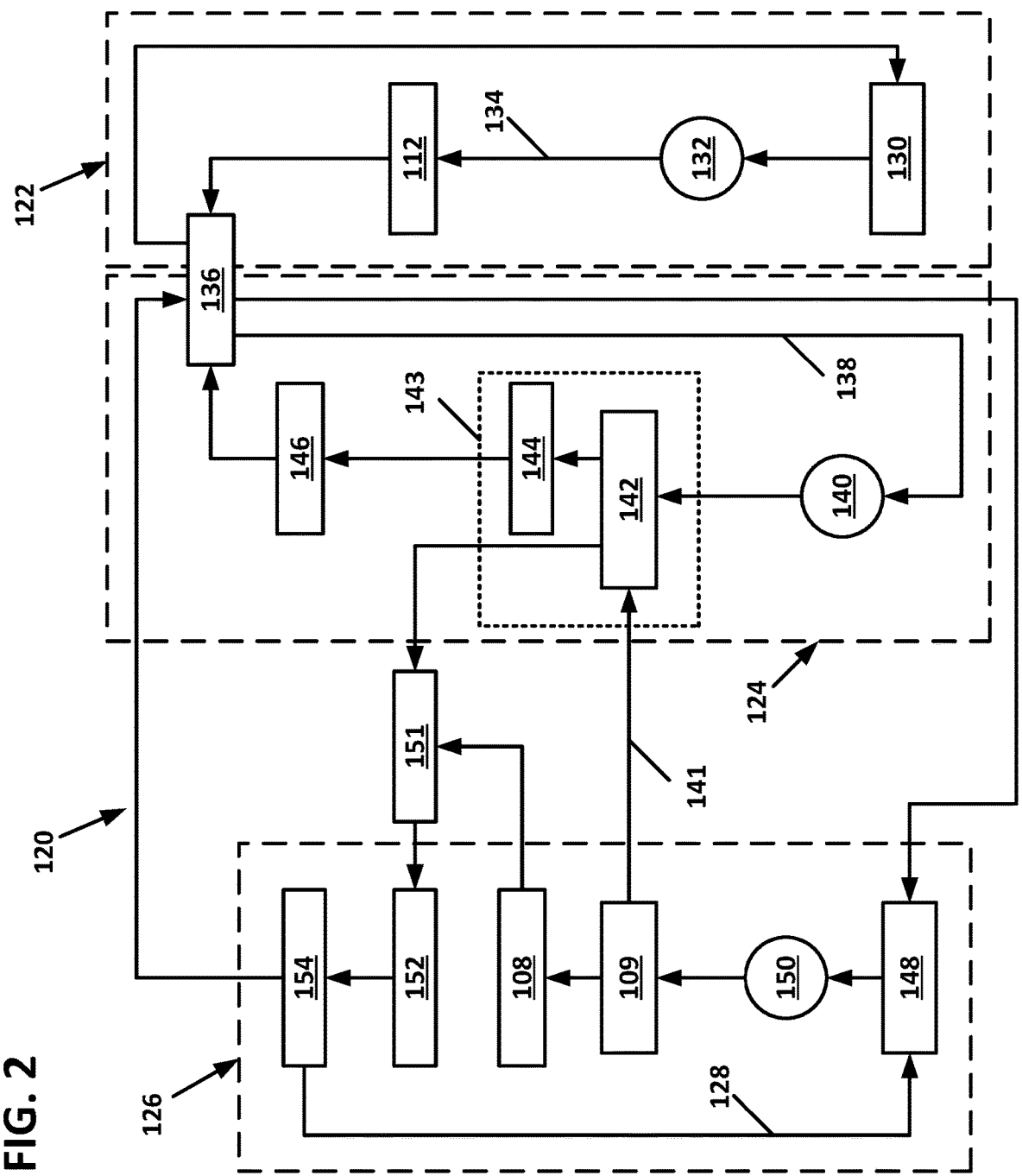
FIG. 2 is a schematic diagram of a thermal management system for use in cooling the power system, the thermal management system including one or more cooling circuits for the propellers, a battery cooling circuit, and a refrigeration circuit.

FIG. 2 illustrates an example thermal management system 120 including one or more cooling circuits 122, 124, 126, 128 that cool various components of the aircraft 100. In the illustrated example, the thermal management system 120 includes a battery cooling circuit 122 configured to cool one or more batteries 112 of the power system 110, a first propeller arrangement cooling circuit 126 configured to cool one or more of the propeller arrangements 108, and a refrigeration circuit 124 configured to cool one or more of the cooling circuits 122, 126. In the example shown, only one propeller arrangement 108 and corresponding cooling circuit 126 is shown. It will be understood however, that the same cooling circuit 126 may service multiple propeller arrangements 108. In other examples, each propeller arrangement 108 may have a respective battery 112 and battery cooling circuit 122.

The refrigeration circuit 124 includes a conduit 138 through which the refrigerant (e.g., a Hydrofluorocarbon such as R-134a or R410A or other refrigerant) is carried through the refrigeration circuit 124. The refrigeration circuit 124 also includes a compressor 140 configured to draw the refrigerant along the conduit 138 and to pressurize (e.g., vaporize) the refrigerant; a condenser arrangement 143 at which heat is removed from the pressurized refrigerant; and an expansion valve 146 at which a pressure drop is created so that low temperature, low pressure refrigerant is then conveyed to the chiller 136.

Figure 3:
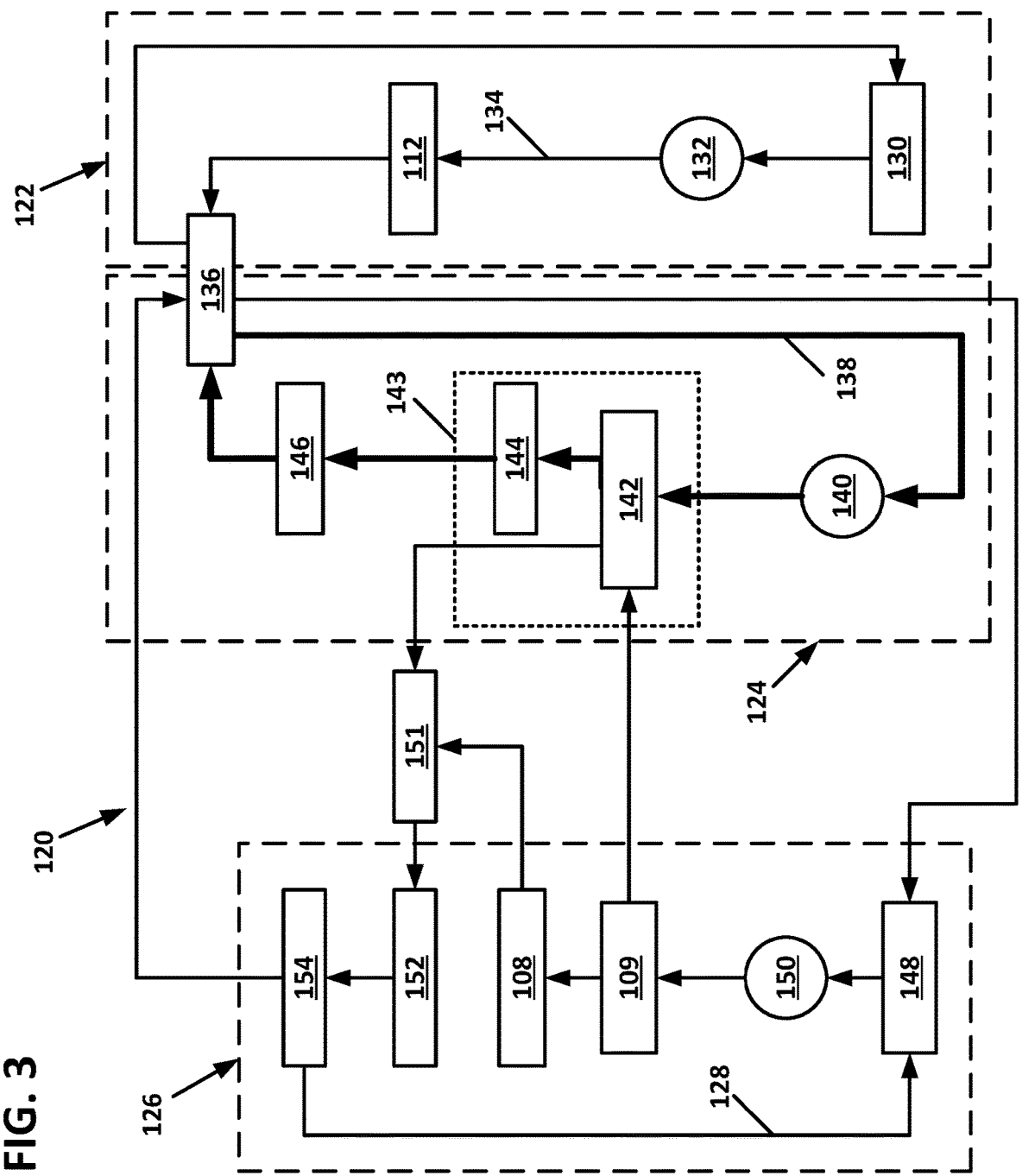
FIG. 3 shows the flow cycle through the refrigeration circuit of the thermal management system of FIG. 2.

In certain implementations, the condenser arrangement 143 includes a liquid-cooled condenser 142 at which at least some heat is removed from the pressurized refrigerant; and an air-cooled condenser 144 at which additional heat is removed from the pressurized refrigerant. In some implementations, the refrigeration circuit 124 circulates the refrigerant through the liquid-cooled condenser 142 before circulating the refrigerant through the air-cooled condenser 144 (e.g., see FIG. 3). In other implementations, however, the refrigerant may be circulated through the air-cooled condenser 144 first. In certain implementations, the air-cooled condenser 144 is exposed to ambient air outside the aircraft 100 or air routed from outside the aircraft to the air-cooled condenser 144.

The battery cooling circuit 122 includes a tank 130 configured to hold coolant (e.g., water, propylene glycol, ethylene glycol, or other antifreeze solution), a pump 132 configured to draw the coolant from the tank 130, and a conduit 134 along which the coolant flows through the battery cooling circuit 122. During standard operation, the conduit 134 is directed from the pump 132 towards the battery 112. After absorbing heat from the battery 112, the coolant is directed to a chiller 136 at which heat is rejected from the coolant to the refrigerant passing through the refrigeration circuit 124. The cooled coolant then passes back to the tank 130 (e.g., see FIG. 4).

The propeller arrangement cooling circuit 126 includes a conduit 128 through which coolant flows through the circuit 126. The propeller arrangement cooling circuits 126 also includes a tank 148, a pump arrangement 150 of one or more pumps to draw coolant from the tank 148 and circulate the coolant through the conduit 128, and a radiator arrangement 152 exposed to ambient air outside the aircraft. The coolant passes from the pump arrangement 150 to a motor and/or an inverter of one or more of the propeller arrangements 108 from which heat is absorbed by the coolant. The heated coolant is air cooled at the radiator 152 before returning to the tank 148 (e.g., see FIG. 4).

Figure 5:
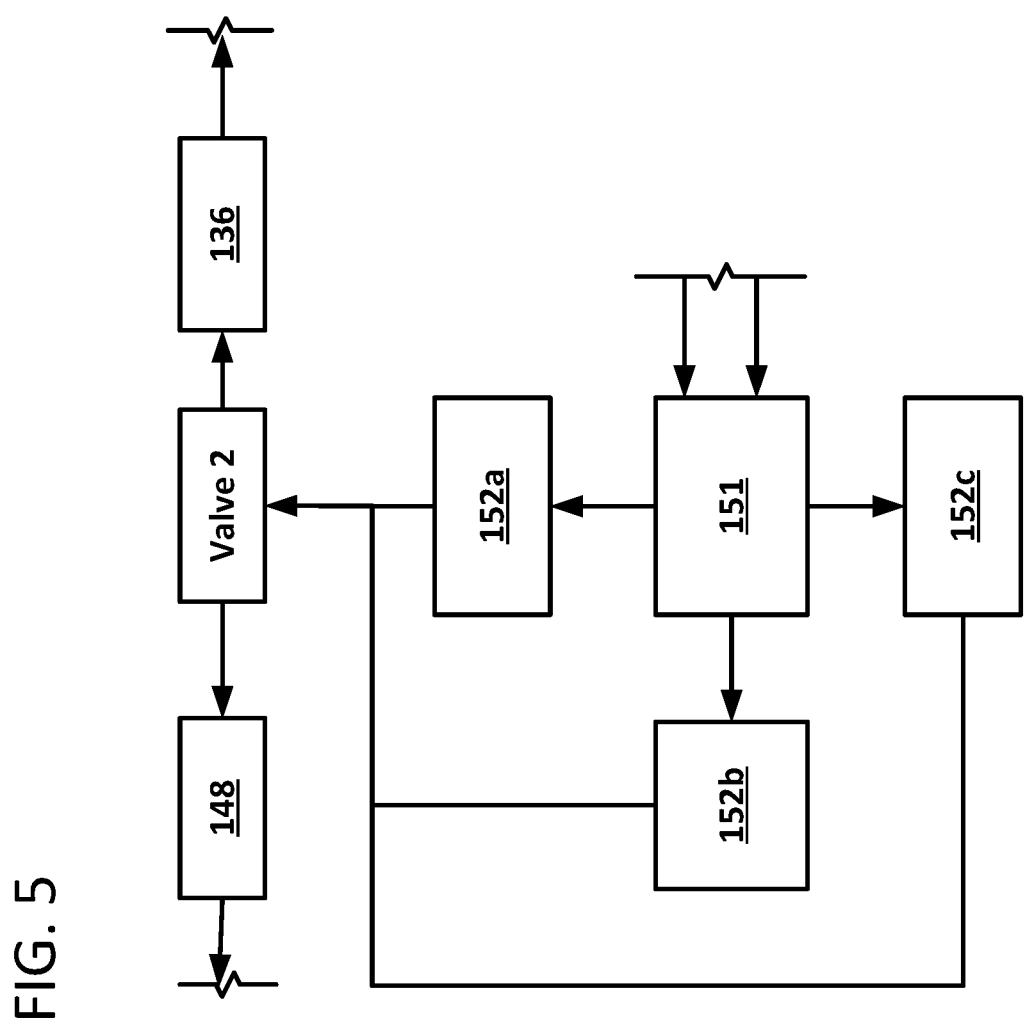
FIG. 5 illustrates an example radiator arrangement for the thermal management system of FIG. 2.

As shown in FIG. 5, the radiator arrangement 152 includes one or more radiators. In certain such implementations, a flow control valve 151 directs coolant flow to the one or more of the radiators. For example, the flow control valve 151 may control how much coolant flows to each radiator. In certain examples, the radiator arrangement 152 includes a radiator for each propeller arrangement 108. In the example shown, the radiator arrangement 152 includes three radiators 152a, 152b, 152c. In other examples, the radiator arrangement 152 may includes a greater or lesser number of radiators. In some implementations, the radiator arrangement 152 includes all of the radiators disposed on a wing 104, 106 of the aircraft 100. In other implementations, the radiator arrangement 152 includes all of the radiators disposed on both wings 104, 106 (e.g., by fluidly combining propeller arrangement cooling circuits 126 of both wings 104, 106).

In accordance with some aspects of the disclosure, the liquid-cooled condenser 142 is cooled by the coolant circulated by the pump 150 of the propeller arrangement cooling circuit 126. For example, the propeller arrangement cooling circuit 126 includes a condenser routing path 141 leading past the liquid-cooled condenser 142 of the refrigeration circuit 124. Coolant routed along the condenser routing path 141 cools the vaporized refrigerant within the condenser 142.

Figure 4:
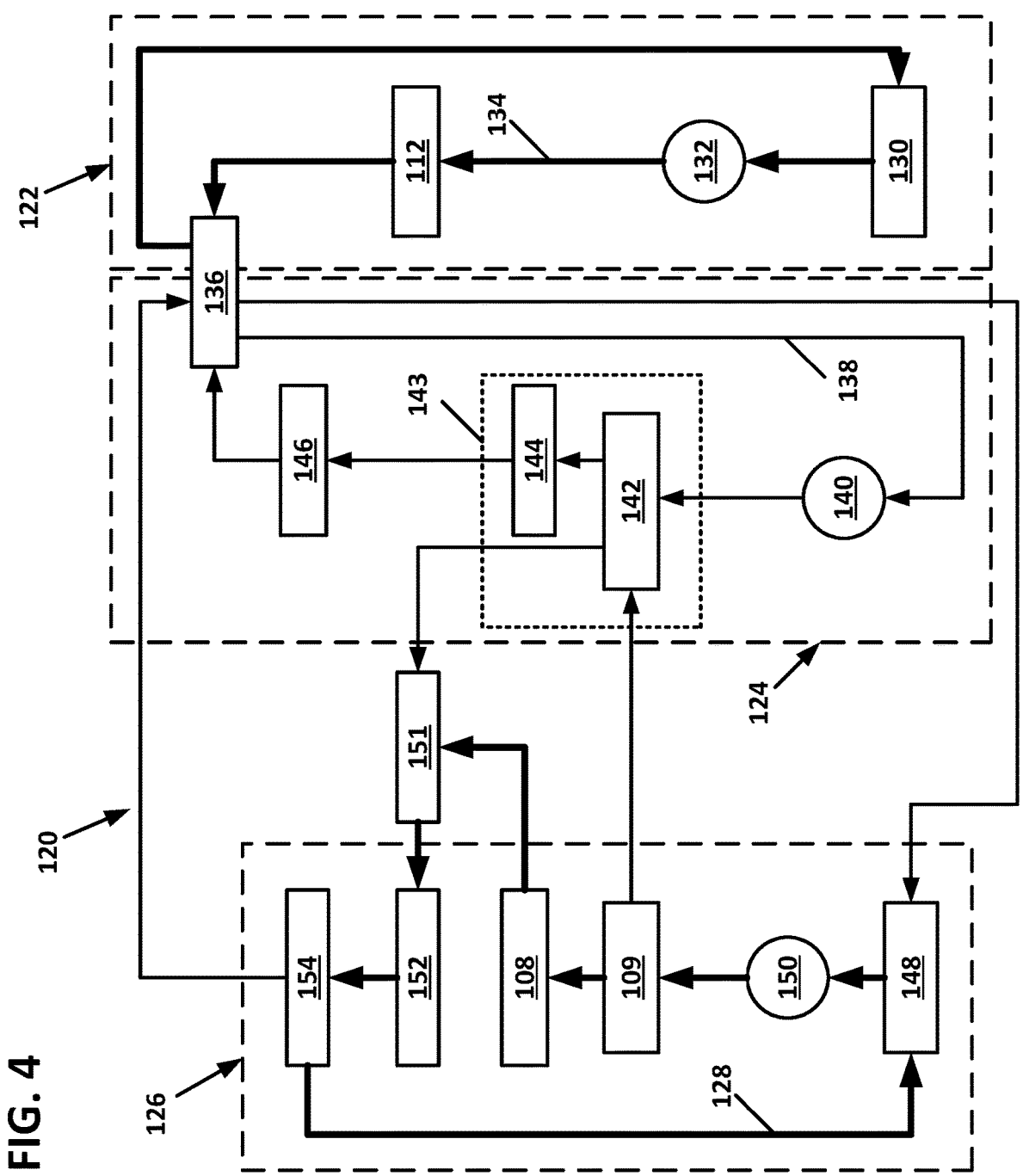
FIG. 4 shows the flow cycle through the battery cooling circuit and the propeller arrangement cooling circuit of the thermal management system of FIG. 2.
Figure 6:
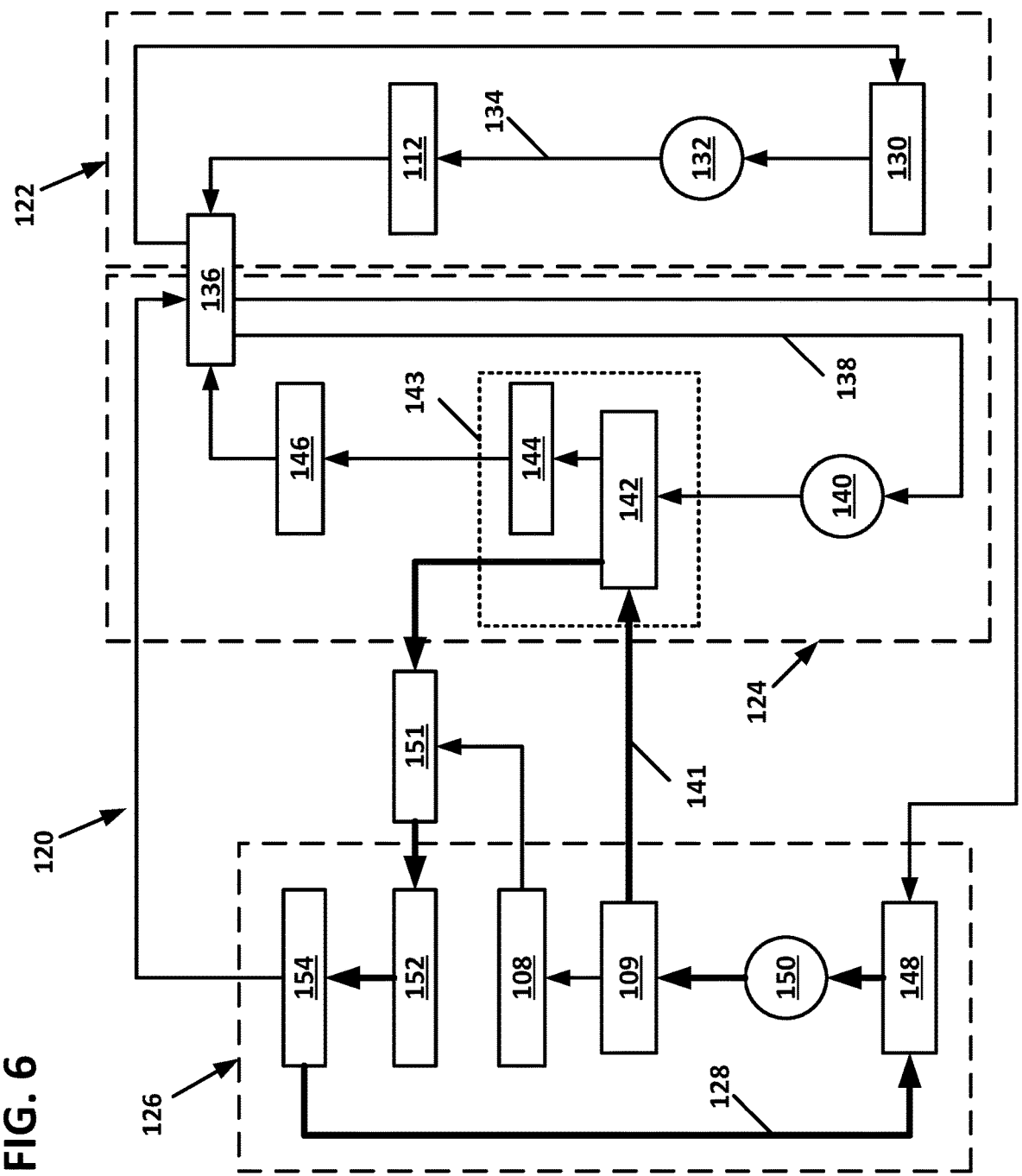
FIG. 6 shows a first example flow cycle for cooling the liquid-cooled condenser of the thermal management system of FIG. 2.

In some implementations, the condenser routing path 141 extends to the liquid-cooled condenser 142 from a location upstream of the propeller arrangement 108 (e.g., see FIG. 4). For example, a first valve arrangement 109 (e.g. a directional control valve) may be disposed downstream of the pump arrangement 150 and downstream of the propeller arrangement 108. The first valve arrangement 109 may direct a first portion (e.g., some, all, or none) of the coolant drawn from the tank 148 to the propeller arrangement 108 (e.g., see FIG. 4). The first valve arrangement 109 also may direct a second portion (e.g., some, all, or none) of the coolant drawn from the tank 148 along the condenser routing path 141 to the liquid-cooled condenser 142 (e.g., see FIGS. 6 and 7). In certain examples, the first portion is larger than the second portion. In certain examples, the first valve arrangement 109 selectively closes the condenser routing path 141 and directs all of the coolant to the propeller arrangement 108 (e.g., see FIG. 4).

Figure 7:
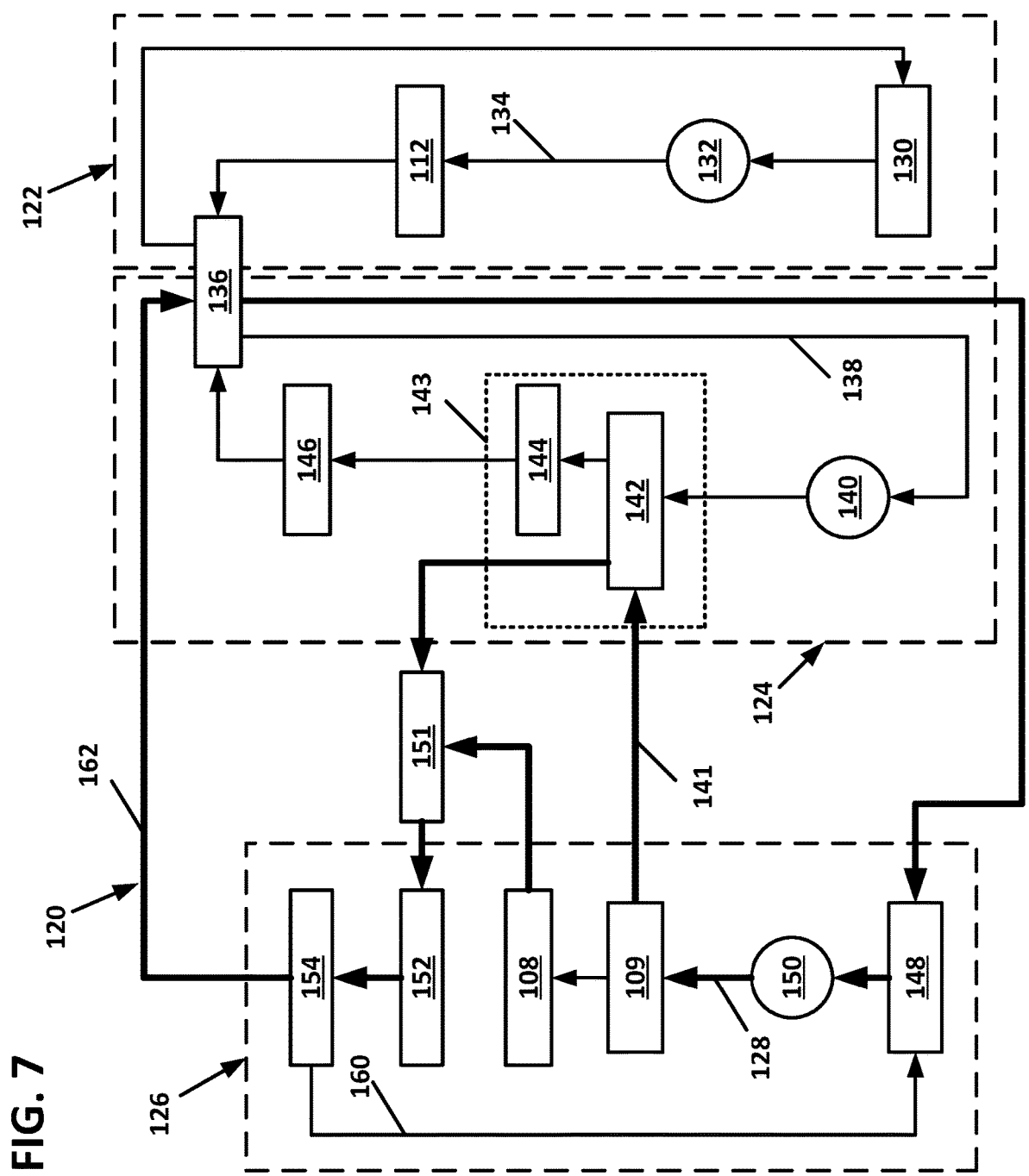
FIG. 7 shows an example coolant flow path providing additional cooling to the coolant of the propeller arrangement cooling circuit.

As shown in FIG. 7, the cooled coolant flowing from the radiator arrangement 152 may be further cooled by the refrigeration circuit 124. For example, a downstream valve arrangement 154 is disposed downstream of the radiator arrangement 152. A first return path 160 extends from the downstream valve arrangement 154 to the tank 148 of the propeller arrangement cooling circuit 126. A second return path 162 extends from the downstream valve arrangement 154 to the chiller 136 and then back to the tank 148. The downstream valve arrangement 154 is configured to selectively direct the coolant from the radiator arrangement 152 along the first return path 160 and/or along the second return path 162.

For example, if the ambient temperature Tamb of air outside the aircraft 100 is below a first threshold T1 (e.g., below 10 degrees Celsius, below 5 degrees Celsius, below 0 degrees Celsius, etc.), then the radiator arrangement 152 is able to provide sufficient cooling to accommodate the heat load from both the propeller arrangement 108 and the liquid-cooled condenser 142. In such cases, the downstream valve arrangement 154 may direct all of the coolant from the radiator 152 back to the tank 148. On the other hand, if the ambient temperature Tamb is above a threshold T2 (e.g., 25 degrees Celsius, 30 degrees Celsius, 35 degrees Celsius, etc.), then the downstream valve arrangement 154 may direct all of the coolant from the radiator 152 to pass through the chiller 136. If the ambient temperature Tamb is between the thresholds T1 and T2, then the downstream valve arrangement 154 may direct a portion of the coolant from the radiator 152 to the tank 148 and another portion of the coolant to the chiller 136 for additional cooling before being returned to the tank 148. Of course, in the event of a fault in the radiator arrangement 152, some or all of the coolant may be directed to the chiller 136 for cooling regardless of the ambient temperature.

In some implementations, each of the coolant circuits 122, 126 operates independently. For example, the battery cooling circuit 122 has a first coolant that circulates around the battery cooling circuit 122 including along a first path through the chiller 136 while the propeller arrangement cooling circuit 126 has a second coolant that circulates around the propeller arrangement cooling circuit 126 including along a separate, second path through the chiller 136 (e.g., see FIG. 2).

Figure 8:
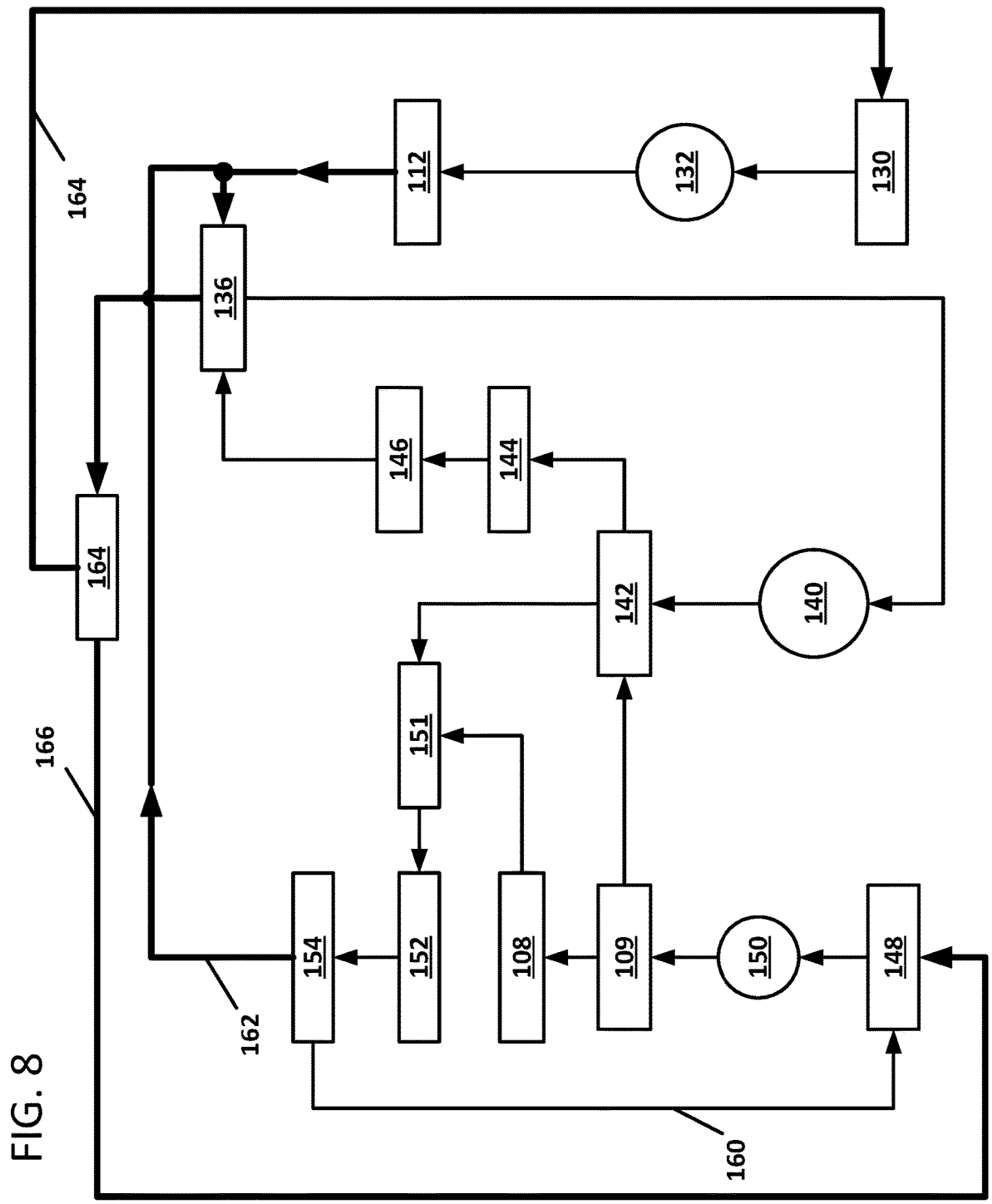
FIG. 8 is a schematic diagram of another example thermal management system that is substantially similar to the thermal management system of FIG. 2 except that the battery cooling circuit and the propeller arrangement cooling circuit are configures to share coolant using a valve arrangement 164.

In other implementations, one or more of the coolant circuits 122, 126 may be fluidly coupled together by a return valve 164 (e.g., a directional control valve). For example, the coolant circuits 122, 126 may be fluidly coupled during a failure of one or more components of one of the coolant circuits or during a period where one or more components of the power system 110 require extra cooling. In certain implementations, the first coolant of the battery arrangement cooling circuit 122 is combined with the second coolant of the propeller arrangement cooling circuit 126 prior to passing through the chiller 136 (e.g., see FIG. 8). The combined fluid may pass along a common pathway through the chiller 136. Downstream of the chiller 136, the combined coolant may be directed to the return valve 164, which directs some of the coolant along a battery circuit return path 164 towards the tank 130 of the battery cooling circuit 122 and other of the coolant along a propeller circuit return path 166 towards the tank 148 of the propeller arrangement cooling circuit 126.

Figure 9:
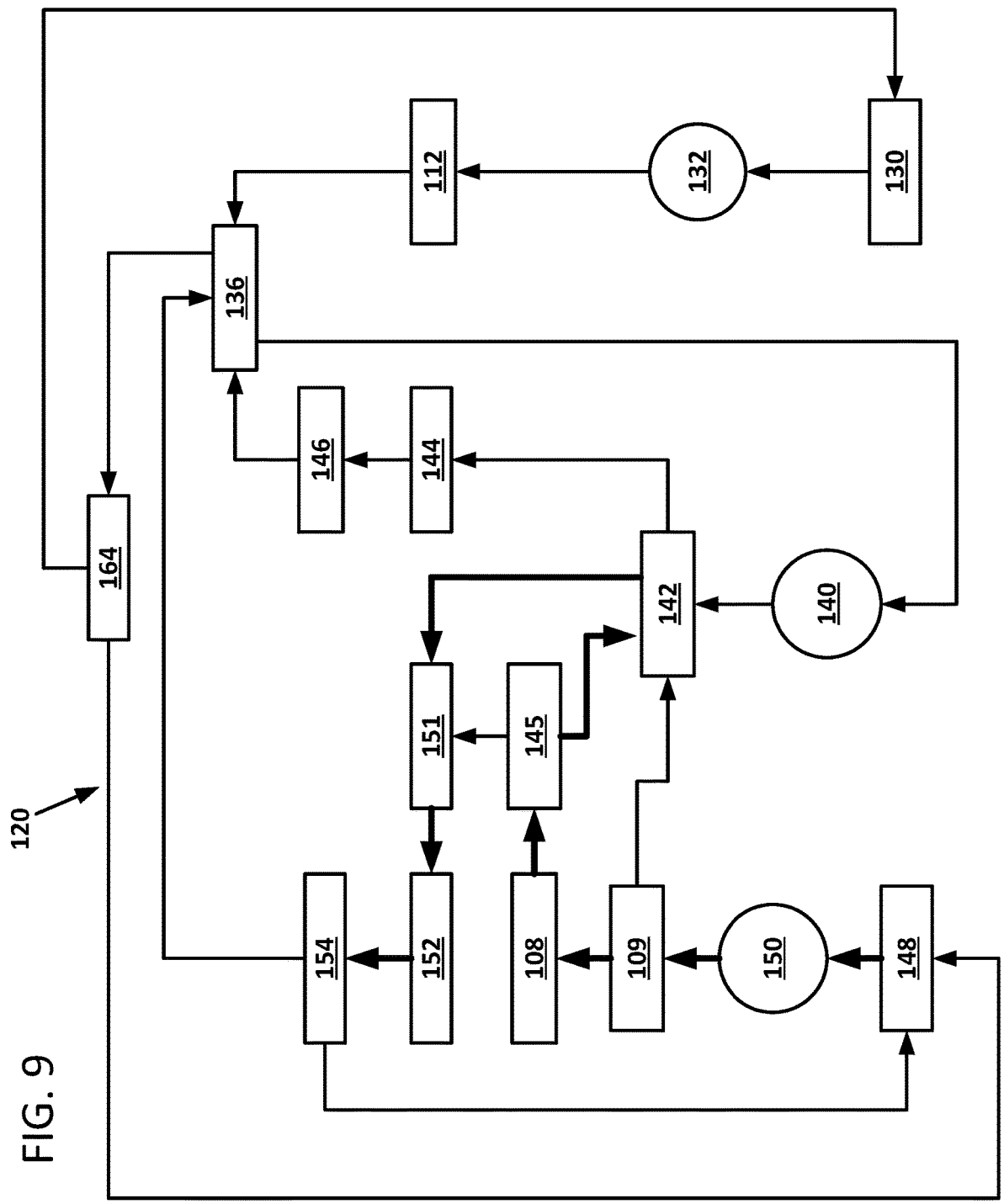
FIG. 9 is a schematic diagram of another example thermal management system in which coolant is routed first to the propeller arrangement and then to the liquid-cooled condenser before being routed to the radiator arrangement for cooling.

FIG. 9 illustrates an alternative configuration of the thermal management system 120 in which coolant is routed to the liquid-cooled condenser 142 after being routed past the propeller arrangement 108. Accordingly, the coolant absorbs heat from the propeller arrangement 108 and from the liquid-cooled condenser 142 before being routed to the radiator arrangement 152. For example, a valve arrangement 145 may be disposed downstream of the propeller arrangement 108 and upstream of the radiator arrangement 152. The valve arrangement 145 (e.g., a directional control valve) selectively directs coolant flow from the propeller arrangement 108 along a first route towards the radiator arrangement 152 and/or along a second route towards the liquid-cooled condenser 142. From the liquid-cooled condenser 142, the heated coolant is routed toward the radiator arrangement 152. In other implementations, the thermal management system 120 does not include a valve arrangement 145 and instead directs all heated coolant from the propeller arrangement 108 to the liquid-cooled condenser 142. In certain implementations, routing the coolant to both the propeller arrangement 108 and the liquid-cooled condenser 142 allows a greater level of fluid flow past these components. In certain implementations, the coolant directed to both the propeller arrangement 108 and the liquid-cooled condenser 142 is cooled at both he radiator arrangement 152 and the chiller 136 (e.g., see the second return path 162 of FIGS. 7 and 8).

Figure 10:
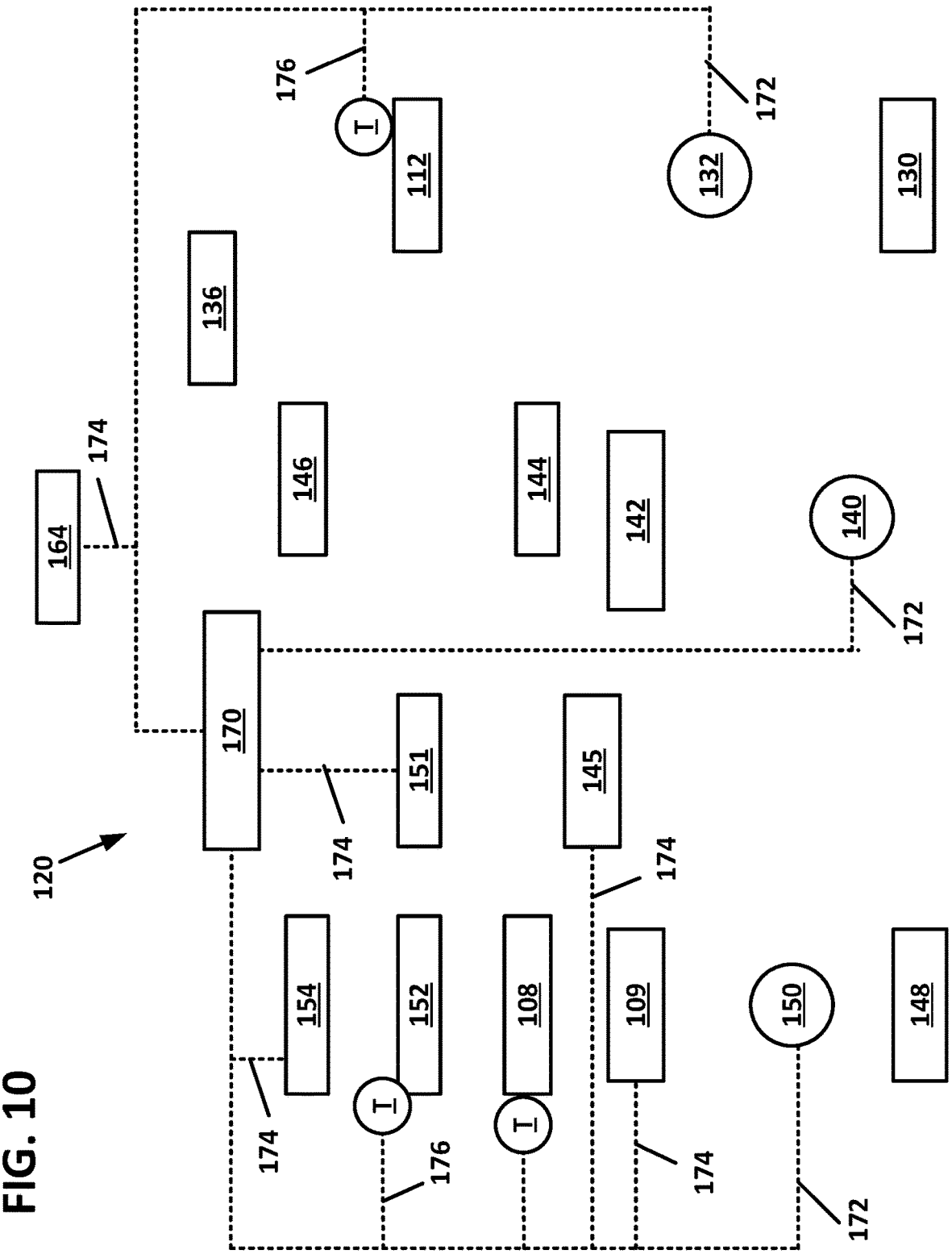
FIG. 10 is a schematic diagram of an electronic controller and corresponding control lines for the thermal management systems of FIGS. 2, 8, and 9.

As shown in FIG. 10, an electronic controller 170 manages operation of various components of the thermal management system 120. The electronic controller 170 includes a memory storing operation instructions and a processor configured to implement the operation instructions. In certain examples, the electronic controller 170 manages operation of the pumps 132, 150 of the coolant circuits 122, 126 and the compressor 140 of the refrigeration circuit 124 via control lines 172. In certain examples, the electronic controller 170 manages operation of the various valves 109, 151, 154, 164, 145 (e.g., directional control valves, flow control valves, etc.) to direct coolant flow through the thermal management system 120 via control lines 174. In certain examples, the electronic controller 170 manages operation of one or more temperature sensors T via control lines 176. The temperature sensors T are configured to measure temperatures (or other properties from which temperature may be derived) along the coolant flow paths of the cooling circuits 122, 126, at various power components (e.g., the battery 112, the propeller arrangement 108, etc.), and/or outside the aircraft (e.g., to determine an ambient temperature). Representative control lines 172, 174, 176 are shown in FIG. 10.

During a flight, the various powered components of the aircraft 100 draw power generally consistently except during certain high power events (e.g., take-off, landing, hovering, turning, etc.). One or more powered components (e.g., one or more propeller arrangements 108, the battery 112, etc.) may need extra cooling during these high power events. Throughout the flight, the electronic controller 170 may monitor temperatures of various components (e.g., the battery 112, the first condenser 142, the propeller arrangement 108, etc.) and may adjust the coolant flow through the thermal management system 120 as needed. For example, the electronic controller 170 may connect and disconnect the coolant circuits 122, 126 as needed to provide more or less cooling to select components. The electronic controller 170 also may increase or decrease an amount of coolant flow along the battery cooling circuit 122 and/or along the propeller arrangement cooling circuit 126 (e.g., by speeding up or slowing down the pumps 132, 150). Similarly, the electronic controller 170 also may increase or decrease the refrigerant flow along the refrigeration circuit 124 (e.g., by speeding up or slowing down the compressor 132).

Figure 11:
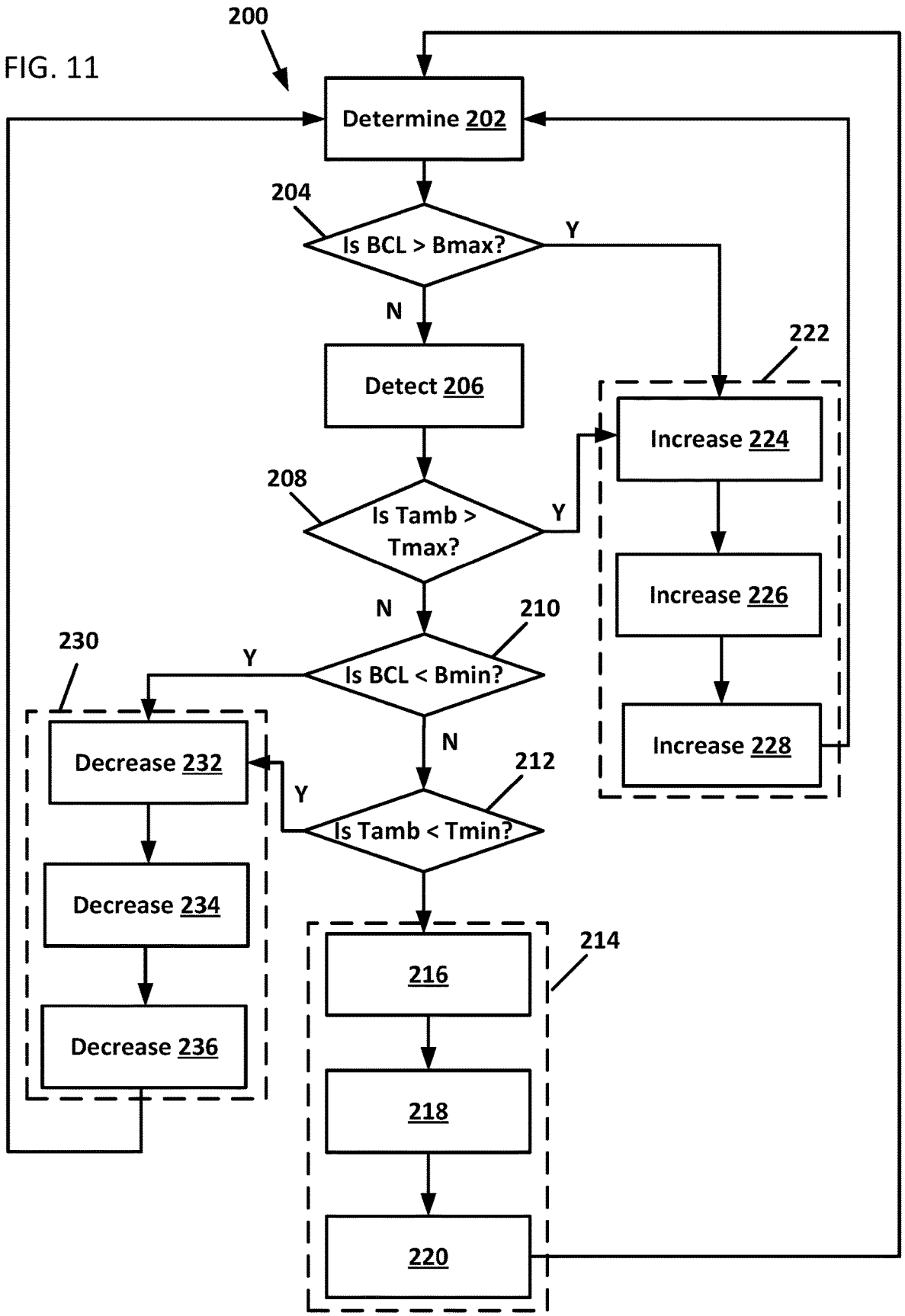
FIG. 11 is a flow chart illustrating a process by which the electronic controller can manage the thermal management system of any of FIGS. 2, 8, and 9.

FIG. 11 is a flow chart illustrating an example process 200 by which the electronic controller 170 manages the thermal management system 120 during a flight. The process 200 includes a determine operation 202 at which a battery cooling load BCL for the battery 112 is determined. For example, the electronic controller 170 may measure a temperature of the battery 112. At module 204, the process 200 determines whether the cooling cooling load BCL of the battery 112 exceeds a predetermined threshold Bmax that is set based on a maximum temperature for which the battery 112 is rated. In an example, the threshold Bmax is set at the maximum temperature for which the battery 112 is rated. In another example, the threshold Bmax is set a few (e.g., 1, 2, 3, 4, or 5) degrees below the maximum temperature for which the battery 112 is rated.

If the process 200 determines the battery is not too hot at module 204, then the process 200 proceeds to a detect operation 206 at which a temperature Tamb of ambient air outside the aircraft 100 is obtained. At module 208, the process 200 determines whether the ambient temperature Tamb is above a predetermined threshold Tmax. In an example, the threshold Tmax is set based on a temperature at which the air-cooled condenser 144 provides inadequate cooling to the coolant. In various examples, the threshold Tmax may be 45 degrees Celsius, 50 degrees Celsius, 55 degrees Celsius, 60 degrees Celsius, etc.). In an example, the threshold Tmax is set based on a temperature at which the radiator 152 provides inadequate cooling to the propeller arrangement 108 during normal operation. In various examples, the threshold Tmax may be 25 degrees Celsius, 30 degrees Celsius, 35 degrees Celsius, etc.).

If the process 200 determines the ambient temperature is not too warm at module 208, then the process 200 proceeds to a third module 210 at which the process 200 determines whether the battery cooling load BCL is below another threshold Tmin that is set based on a minimum temperature for which the battery 112 is rated. In an example, the threshold Bmin is set at the minimum temperature for which the battery 112 is rated. In another example, the threshold Bmin is set a few (e.g., 1, 2, 3, 4, or 5) degrees above the minimum temperature for which the battery 112 is rated. At module 212, the process 200 determines whether the ambient temperature Tamb is below a predetermined threshold Tmin. In an example, the threshold Tmin is set based on a temperature at which the air-cooled condenser 144 cools the coolant below the Bmin temperature threshold.

If the process 200 determines the battery cooling load BCL is within the thresholds Bmax and Bmin and determines the ambient temperature is within the temperature thresholds Tmax and Tmin, then the process 200 proceeds a set 214 of operations at which the electronic controller 170 operates the coolant circuits 122, 126 and the refrigerant circuit 124 in a normal state. In certain examples, the operation set 214 includes a first operation 216 at which a percentage of coolant flow the valve 109 directs to the first condenser 142 is determined and set. In certain examples, the percentage of coolant flow is determined to be zero and the condenser routing path 141 is closed. In certain examples, the operation set 214 also includes a second operation 218 at which a speed of the compressor 140 is determined and set to provide sufficient cooling to the coolant of the battery cooling circuit 122. In certain examples, the operation set 214 includes a third operation 220 at which a speed of the battery pump 132 is determined and set to provide adequate coolant flow past the battery 112 to sufficiently cool the battery 112 (e.g., to maintain a battery temperature between 20 and 30 degrees Celsius, between 15 and 35 degrees Celsius, between 22 and 28 degrees Celsius, between 10 and 40 degrees Celsius, etc.).

However, if the battery cooling load BCL is determined at module 204 to be greater than the threshold Bmax or if the ambient temperature Tamb is determined at module 208 to be greater than the threshold Tmax, then the process 200 proceeds to a first adjustment set 222 of operations at which the electronic controller 170 modifies operation of the refrigerant circuit 124, the battery cooling circuit 122, and/or the propeller arrangement cooling circuit 126 to increase the level of cooling provided to the battery 112.

In certain implementations, the first adjustment set 222 of operations includes a first increase operation 224 at which the percentage flow of coolant directed to the liquid-cooled condenser 142 is increased. For example, the electronic controller 170 may actuate the valve 109 to begin directing coolant flow (or to increase coolant flow) to the liquid-cooled condenser 142. In certain examples, the electronic controller 170 may increase a speed of the pump 150 to increase the flow rate past the liquid-cooled condenser 142. Increasing the flow of coolant to the liquid-cooled condenser will increase the amount of cooling of the refrigerant at the liquid-cooled condenser 142 and hence enhance the efficiency of the refrigerant circuit 124. Accordingly, the liquid-cooled condenser 142 may supplement cooling the refrigerant when a warm ambient temperature Tamb mitigates the amount of cooling provided by the air-cooled condenser 144.

In certain implementations, the first adjust set 222 of operations also may include fluidly connecting the propeller arrangement cooling circuit 126 to the battery cooling circuit 122 to enhance the level of cooling provided to the liquid-cooled condenser 142. For example, the electronic controller 170 may actuate the downstream valve arrangement 154 to fluidly couple the first coolant and the second coolant. Accordingly, the coolant cooling the liquid-cooled condenser 142 would be cooled both by the radiator 152 of the propeller arrangement cooling circuit 126 and also by the refrigeration circuit 124 at the chiller 136 of the battery cooling circuit 122.

In certain implementations, the first adjustment set 222 of operations includes a second increase operation 226 at which the flow of refrigerant through the refrigeration circuit 124 is increased. For example, the electronic controller 170 may increase a speed of the compressor 140. In certain implementations, the first adjustment set 222 of operations includes a third increase operation 228 at which a coolant flow through the battery cooling circuit 122 is increased. For example, the electronic controller 170 may increase the speed of the battery pump 132. The process 200 returns to the determine operation 202 to check the temperatures again.

On the other hand, if the battery cooling load BCL is determined at module 210 to be less than the threshold Bmin or if the ambient temperature Tamb is determined at module 212 to be less than the threshold Tmin, then the process 200 proceeds to a second adjustment set 230 of operations at which the electronic controller 170 modifies operation of the refrigerant circuit 124, the battery cooling circuit 122, and/or the propeller arrangement cooling circuit 126 to decrease the level of cooling provided to the battery 112 and/or to the propeller arrangement 108.

In certain implementations, the second adjustment set 230 of operations includes a first decrease operation 232 at which the percentage flow of coolant directed to the liquid-cooled condenser 142 is decreased. For example, the electronic controller 170 may actuate the valve 109 to reduce the amount of coolant directed to the liquid-cooled condenser 142. In an example, the electronic controller 170 may actuate the valve 109 to close the condenser routing path 141 to cease coolant flow to the liquid-cooled condenser 142. In such examples, the refrigerant would rely on air cooling by the condenser 144.

In certain implementations, the second adjustment set 230 of operations includes a second decrease operation 234 at which the flow of refrigerant through the refrigeration circuit 124 is decreased. For example, the electronic controller 170 may decrease a speed of the compressor 140. In certain implementations, the second adjustment set 230 of operations includes a third decrease operation 236 at which a coolant flow through the battery cooling circuit 122 is decreased. For example, the electronic controller 170 may decrease the speed of the battery pump 132. The process 200 returns to the determine operation 202 to check the temperatures again.

ASPECTS OF THE INVENTION

1. A thermal management system for an aircraft including a propeller arrangement and a battery powering the propeller arrangement, the thermal management system comprising:
   a refrigeration circuit including a compressor, a condenser arrangement, an expansion valve, and a chiller, the compressor being configured to route a refrigerant past the condenser arrangement and past the expansion valve to the chiller, the condenser arrangement including an air-cooled condenser exposed to ambient temperature air outside the aircraft and a liquid-cooled condenser;
   a battery cooling circuit configured to route first coolant past the battery of the aircraft, the battery cooling circuit including a first tank, a first pump, and the chiller, the first pump being configured to direct the first coolant from the first tank, past the battery at which heat is absorbed by the first coolant, to the chiller at which heat is rejected from the first coolant to the refrigerant; and
   a propeller arrangement cooling circuit configured to cool the propeller arrangement of the aircraft using second coolant drawn from a second tank by a second pump, the propeller arrangement cooling circuit including a radiator arrangement exposed to the ambient temperature air, the propeller arrangement cooling circuit including a condenser routing path leading past the liquid-cooled condenser of the refrigeration circuit so that any second coolant routed along the condenser routing path cools the liquid-cooled condenser.
2. The thermal management system of aspect 1, further comprising a directional control valve disposed upstream of the propeller arrangement, a propeller routing path from the directional control valve to the propeller arrangement, and the condenser routing path from the directional control valve to the liquid-cooled condenser, the directional control valve determining how much of the second coolant is directed along the propeller and condenser routing paths.
3. The thermal management system of aspect 2, wherein the directional control valve is configured to direct all of the second coolant along the first flow path.
4. The thermal management system of aspect 2, wherein the directional control valve is configured to direct a first portion of the second coolant along the propeller routing path and to direct a second portion of the second coolant along the condenser routing path.
5. The thermal management system of aspect 4, wherein the first portion is larger than the second portion.
6. The thermal management system of any of aspects 1-5, wherein the radiator arrangement includes a plurality of radiators that are each exposed to the ambient temperature air outside of the aircraft.
7. The thermal management system of aspect 6, further comprising a flow control valve disposed upstream of the radiator arrangement, the flow control valve controlling an amount of the second coolant routed to each of the plurality of radiators.
8. The thermal management system of aspect 6 or aspect 7, wherein all of the radiators are carried by a wing of the aircraft.
9. The thermal management system of any of aspects 1-8, further comprising:
   a valve arrangement disposed upstream of the radiator arrangement and downstream of the propeller arrangement;
   a first flow path extending from the valve arrangement to the liquid-cooled condenser; and
   a second flow path extending from the valve arrangement towards the radiator arrangement;
   wherein the valve arrangement is configured to direct the second coolant along the first flow path and/or along the second flow path.
10. The thermal management system of any of aspects 1-8, further comprising:
    a downstream valve arrangement disposed downstream of the radiator arrangement;
    a first return path extending from the downstream valve arrangement to the second tank of the propeller arrangement cooling circuit; and
    a second return path extending from the downstream valve arrangement to the chiller;
    wherein the downstream valve arrangement is configured to direct the second coolant from the radiator arrangement along the first return path and/or along the second return path.
11. The thermal management system of any of aspects 1-10, further comprising:
    a return valve disposed upstream of the chiller;
    a battery circuit return path extending from the return valve to the first tank of the battery cooling circuit; and
    a propeller circuit return path extending from the return valve to the second tank of the propeller arrangement cooling circuit;
    wherein the return valve is configured to receive a combination of first and second coolant from the chiller and to direct one portion of the combination along the battery circuit return path and another portion of the combination along the propeller circuit return path.
12. The thermal management system of any of aspects 1-10, wherein the first coolant flows along a first path through the chiller and the second coolant flows along a second path through the chiller that is separate from the first path, each of the first and second paths being disposed relative to a refrigerant path through the chiller to enable heat rejection from the first and second paths to the refrigerant path.
13. A method of cooling a propeller arrangement of an aircraft, the method comprising:
    routing a first portion of coolant from a tank to the propeller arrangement using a pump arrangement so that the coolant absorbs heat from the propeller arrangement;

routing the heated first portion of the coolant from the propeller arrangement to a radiator arrangement at which the heated first portion of the coolant is cooled by ambient air outside the aircraft;

routing a second portion of the coolant from the tank to a liquid-cooled condenser of a refrigeration circuit at which heat from refrigerant is rejected to the second portion of the coolant; and routing the heated second portion of the coolant from the liquid-cooled condenser to the radiator arrangement.

14. The method of aspect 13, further comprising routing the refrigerant along the refrigeration circuit using a compressor, the refrigeration circuit also including an air-cooled condenser and a chiller.

15. The method of aspect 14, wherein the coolant is a first coolant; and wherein the method further comprises routing a second coolant past a battery of the aircraft and then past the chiller to reject heat to the refrigerant.

16. The method of aspect 15, further comprising:
determining a battery cooling load is above a battery cooling load threshold;
increasing a flow rate of the second coolant along past the battery and the chiller;
increasing a flow rate of the refrigerant along the refrigeration circuit; and
increasing a flow rate of the second portion of the first coolant to the liquid-cooled condenser.

17. The method of aspect 15, further comprising routing the first coolant through the chiller separate from the second coolant.

18. The method of any of aspects 15-17, further comprising combining the first coolant and the second coolant to form a combination coolant, routing the combination coolant through the chiller and then to a return valve, and routing a portion of the combination coolant from the return valve to the tank.

19. The method of any of aspects 13-18, further comprising:
determining an ambient temperature of air outside the aircraft is above a first threshold;
increasing a flow of the second portion of the coolant to the liquid-cooled condenser in response to the determination; and
increasing a flow rate of refrigerant around the refrigeration circuit.

20. The method of any of aspects 13-19, further comprising:
determining an ambient temperature of air outside the aircraft is below a second threshold;
decreasing a flow of the second portion of the coolant to the liquid-cooled condenser in response to the determination; and
decreasing a flow rate of refrigerant around the refrigeration circuit.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A thermal management system for an aircraft including a propeller arrangement and a battery powering the propeller arrangement, the thermal management system comprising:
a refrigeration circuit including a compressor, a condenser arrangement, an expansion valve, and a chiller, the compressor being configured to route a refrigerant past the condenser arrangement and past the expansion valve to the chiller, the condenser arrangement including an air-cooled condenser exposed to ambient temperature air outside the aircraft and a liquid-cooled condenser;
a battery cooling circuit configured to route first coolant past the battery of the aircraft, the battery cooling circuit including a first tank, a first pump, and the chiller, the first pump being configured to direct the first coolant from the first tank, past the battery at which heat is absorbed by the first coolant, to the chiller at which heat is rejected from the first coolant to the refrigerant; and
a propeller arrangement cooling circuit configured to cool the propeller arrangement of the aircraft using second coolant drawn from a second tank by a second pump, the propeller arrangement cooling circuit including a radiator arrangement exposed to the ambient temperature air, the propeller arrangement cooling circuit including a condenser routing path leading past the liquid-cooled condenser of the refrigeration circuit so that any second coolant routed along the condenser routing path cools the liquid-cooled condenser.

2. The thermal management system of claim 1, further comprising a directional control valve disposed upstream of the propeller arrangement, a propeller routing path from the directional control valve to the propeller arrangement, and the condenser routing path from the directional control valve to the liquid-cooled condenser, the directional control valve determining how much of the second coolant is directed along the propeller and condenser routing paths.

3. The thermal management system of claim 2, wherein the directional control valve is configured to direct all of the second coolant along the first flow path.

4. The thermal management system of claim 2, wherein the directional control valve is configured to direct a first portion of the second coolant along the propeller routing path and to direct a second portion of the second coolant along the condenser routing path.

5. The thermal management system of claim 4, wherein the first portion is larger than the second portion.

6. The thermal management system of claim 1, wherein the radiator arrangement includes a plurality of radiators that are each exposed to the ambient temperature air outside of the aircraft.

7. The thermal management system of claim 6, further comprising a flow control valve disposed upstream of the radiator arrangement, the flow control valve controlling an amount of the second coolant routed to each of the plurality of radiators.

8. The thermal management system of claim 6, wherein all of the radiators are carried by a wing of the aircraft.

9. The thermal management system of claim 1, further comprising:
a valve arrangement disposed upstream of the radiator arrangement and downstream of the propeller arrangement;
a first flow path extending from the valve arrangement to the liquid-cooled condenser; and
a second flow path extending from the valve arrangement towards the radiator arrangement;
wherein the valve arrangement is configured to direct the second coolant along the first flow path and/or along the second flow path.

10. The thermal management system of claim 1, further comprising:
a downstream valve arrangement disposed downstream of the radiator arrangement;

a first return path extending from the downstream valve arrangement to the second tank of the propeller arrangement cooling circuit; and a second return path extending from the downstream valve arrangement to the chiller;

wherein the downstream valve arrangement is configured to direct the second coolant from the radiator arrangement along the first return path and/or along the second return path.

11. The thermal management system of claim 1, further comprising:

a return valve disposed upstream of the chiller;

a battery circuit return path extending from the return valve to the first tank of the battery cooling circuit; and a propeller circuit return path extending from the return valve to the second tank of the propeller arrangement cooling circuit;

wherein the return valve is configured to receive a combination of first and second coolant from the chiller and to direct one portion of the combination along the battery circuit return path and another portion of the combination along the propeller circuit return path.

12. The thermal management system of claim 1, wherein the first coolant flows along a first path through the chiller and the second coolant flows along a second path through the chiller that is separate from the first path, each of the first and second paths being disposed relative to a refrigerant path through the chiller to enable heat rejection from the first and second paths to the refrigerant path.

* * * * *